(12) United States Patent
Rangasamy et al.

(10) Patent No.: US 10,623,680 B1
(45) Date of Patent: Apr. 14, 2020

(54) DATA CENTER VIEWING SYSTEM

(71) Applicant: Equinix, Inc., Redwood City, CA (US)

(72) Inventors: Venkatachalam Rangasamy, Fremont, CA (US); Purvish Purohit, Sunnyvale, CA (US); Vijaay Doraiswamy, Fremont, CA (US); Jaganathan Jeyapaul, Saratoga, CA (US); Brian J. Lillie, Los Altos, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 16/032,298

(22) Filed: Jul. 11, 2018

Related U.S. Application Data

(60) Provisional application No. 62/531,246, filed on Jul. 11, 2017.

(51) Int. Cl.
*G06K 9/00* (2006.01)
*H04N 5/445* (2011.01)
*G06F 21/60* (2013.01)

(52) U.S. Cl.
CPC ....... *H04N 5/44504* (2013.01); *G06F 21/604* (2013.01); *G06K 9/00711* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 8,086,071 B2 | 12/2011 | Chen et al. | |
| 8,340,351 B2 | 12/2012 | Adcock | |
| 8,666,167 B2 | 3/2014 | Albouyeh | |
| 9,473,745 B2 | 10/2016 | Filip | |
| 9,602,871 B1 * | 3/2017 | Holcomb | H04N 21/4542 |
| 9,807,306 B2 * | 10/2017 | Yu | H04N 5/23293 |
| 10,313,638 B1 * | 6/2019 | Yeturu | H04N 7/185 |
| 2003/0051039 A1 * | 3/2003 | Brown | G06Q 20/1235 709/229 |
| 2005/0129324 A1 * | 6/2005 | Lemke | H04N 1/387 382/254 |

(Continued)

OTHER PUBLICATIONS

Chen et al., "Real Time Video Anonymizer," people.ece.cornell.edu, 2015 (Applicant points out, in accordance with MPEP 609.04(a), that the year of publication, 2015, is sufficiently earlier than the effective U.S. filling date, 2018, so that the particular month of publication is not in issue.) 5 pp.

*Primary Examiner* — Jayanti K Patel
*Assistant Examiner* — Stefan Gadomski
(74) *Attorney, Agent, or Firm* — Shumaker & Sieffert, P.A.

(57) ABSTRACT

A method includes receiving, by an asset privacy system, an input video feed that includes images of one or more assets located within a data center, identifying, by the asset privacy system, one or more corresponding assets for the images of the one or more assets, determining, by the asset privacy system, an asset of the one or more assets a customer is not authorized to view, and generating, from the input video feed, by the asset privacy system based at least on the determining, an output video feed that does not include images of the asset the customer is not authorized to view and that does include images of at least one other asset of the one or more assets.

23 Claims, 4 Drawing Sheets

(56) References Cited

U.S. PATENT DOCUMENTS

| | | | |
|---|---|---|---|
| 2005/0271250 A1* | 12/2005 | Vallone | G06K 9/00288 382/103 |
| 2007/0239683 A1* | 10/2007 | Gallagher | G06K 9/00221 |
| 2007/0283005 A1* | 12/2007 | Beliles | H04L 41/0816 709/224 |
| 2008/0199155 A1* | 8/2008 | Hagens | H04N 7/141 386/291 |
| 2009/0027500 A1* | 1/2009 | Elangovan | G06K 9/6202 348/159 |
| 2009/0309570 A1* | 12/2009 | Lehmann | G06F 1/26 323/318 |
| 2010/0205667 A1* | 8/2010 | Anderson | G06F 3/013 726/19 |
| 2011/0002542 A1* | 1/2011 | Adcock | G11B 27/034 382/181 |
| 2011/0161999 A1* | 6/2011 | Klappert | H04N 21/4307 725/25 |
| 2012/0006507 A1* | 1/2012 | Su | H05K 7/20754 165/80.2 |
| 2012/0008916 A1* | 1/2012 | Lane | G11B 27/034 386/241 |
| 2012/0282974 A1* | 11/2012 | Green | H04W 4/12 455/550.1 |
| 2013/0036314 A1* | 2/2013 | Glew | G06F 12/1408 713/194 |
| 2013/0083198 A1* | 4/2013 | Maslan | H04N 7/188 348/155 |
| 2014/0071290 A1* | 3/2014 | Collen | H04N 9/79 348/159 |
| 2014/0176663 A1* | 6/2014 | Cutler | G06T 7/50 348/14.07 |
| 2015/0098613 A1* | 4/2015 | Gagvani | G06T 7/254 382/103 |
| 2015/0186677 A1* | 7/2015 | Sankar | G06F 21/71 726/34 |
| 2015/0228028 A1* | 8/2015 | Friedman | G06Q 40/08 705/4 |
| 2015/0296170 A1* | 10/2015 | Farrell | H04N 5/913 386/254 |
| 2015/0355036 A1* | 12/2015 | Giorgi | H04L 12/2825 702/130 |
| 2016/0012218 A1* | 1/2016 | Perna | G06F 16/5838 726/18 |
| 2016/0132731 A1* | 5/2016 | Hisada | G06K 9/6262 382/103 |
| 2016/0182527 A1* | 6/2016 | Lietz | H04L 63/105 726/6 |
| 2016/0335484 A1* | 11/2016 | Xie | G06K 9/00335 |
| 2016/0350596 A1* | 12/2016 | Bataller | G06T 7/80 |
| 2016/0366562 A1* | 12/2016 | Chidananda | G01S 5/0289 |
| 2016/0379412 A1* | 12/2016 | Butler | G06T 19/006 345/633 |
| 2017/0046891 A1* | 2/2017 | Trivelpiece | G07C 9/00111 |
| 2017/0064262 A1* | 3/2017 | Mozer | H04N 7/188 |
| 2017/0124713 A1* | 5/2017 | Jurgenson | G06T 19/006 |
| 2017/0185808 A1* | 6/2017 | Zhang | G06F 21/84 |
| 2017/0192988 A1* | 7/2017 | Giertler | G06F 16/951 |
| 2017/0289623 A1* | 10/2017 | Bailey | G06F 3/011 |
| 2018/0012078 A1* | 1/2018 | Pournaghi | G06K 9/00718 |
| 2018/0091856 A1* | 3/2018 | Ayers | H04N 21/4542 |
| 2018/0097560 A1* | 4/2018 | Jalali | H04W 28/0236 |
| 2018/0367552 A1* | 12/2018 | Burriesci | G06F 21/125 |

* cited by examiner

DATA CENTER VIEWING SYSTEM

The application claims the benefit of priority of U.S. Provisional Application Ser. No. 62/531,246, filed Jul. 11, 2017, the contents of which is incorporated by reference herein in its entirety.

TECHNICAL FIELD

The disclosure relates to data centers, and more specifically, to viewing customer assets within a multi-tenant co-location facility.

BACKGROUND

A facility such as a data center includes a data center storage space storing numerous electronic devices that produce heat, including network, server, and storage gear, as well as power distribution units for distributing power to devices within the facility. In some examples, a network services exchange provider or co-location provider (hereinafter, "provider") may employ a communication facility, such as a data center or warehouse, in which multiple customers of the network services exchange provider locate network, server, and storage gear and interconnect to a variety of telecommunications and other network service provider(s). The overall data center storage space may be shared by the multiple customers or "tenants" of the data center provider.

SUMMARY

In general, techniques are described for selective presentation, to a display device associated with a customer, of data center assets of the data center provider based on authorization of the customer to view the data center assets. The data center may be a co-location facility in which multiple customers co-locate its network equipment. Within the data center, each customer may own one or more assets, such as network, server, and storage gear located within a customer cage or cabinet. Each customer may also be authorized to view one or more provider assets owned by the data center provider, such as power generation and distribution units, cooling units, cable trays and distribution facilities, as well as network, server, and storage gear.

Systems such as virtual reality systems, augmented reality systems, live video feeds, or the like, may be used in order for an operator associated with a customer to remotely view customer assets. The asset viewing system described herein modifies video data to obscure images of assets that a customer is not authorized to view, e.g., assets of other customers co-located within the data center. In this way, the asset viewing system allows the operator to view customer assets and/or assets owned by the provider, while also providing customers with an extra security measure in that a customer may only be able to view its own assets, while assets of another customer are obscured, and vice versa. As a result, the techniques may provide the technical advantage of a customized output video feeds each tailored to a different customer of the data center provider that facilitates customer asset privacy within the data center while still offering, for each customer, viewing of customer assets (and in some cases data center provider assets) the customer is authorized to view. This may improve the technical operation of the data center by increasing security and/or privacy of the many tenants/customers having equipment co-located therein and, at least in some cases, reducing a need for on-site operator visits.

In one example, a method includes receiving, by an asset privacy system, an input video feed that includes images of one or more assets located within a data center, identifying, by the asset privacy system, one or more corresponding assets for the images of the one or more assets, determining, by the asset privacy system, an asset of the one or more assets a customer is not authorized to view, and generating, from the input video feed, by the asset privacy system based at least on the determining, an output video feed that does not include images of the asset the customer is not authorized to view and that does include images of at least one other asset of the one or more assets.

In another example, a system includes an input device and an asset privacy system. The asset privacy system is configured to receive an input video feed that includes images of one or more assets located within a data center, identify one or more corresponding assets for the images of the one or more assets, determine an asset of the one or more assets a customer is not authorized to view, and generate, from the input video feed based at least on the determination, an output video feed that does not include images of the asset the customer is not authorized to view and that does include images of at least one other asset of the one or more assets.

In another example, a system includes an input device and an asset privacy system. The asset privacy system is configured to receive an input video feed that includes images of one or more areas located within a data center, identify one or more corresponding areas for the images of the one or more areas, determine an area of the one or more areas a customer is not authorized to view, and generate, from the input video feed based at least on the determination, an output video feed that does not include images of the area the customer is not authorized to view and that does include images of at least one other area of the one or more areas.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
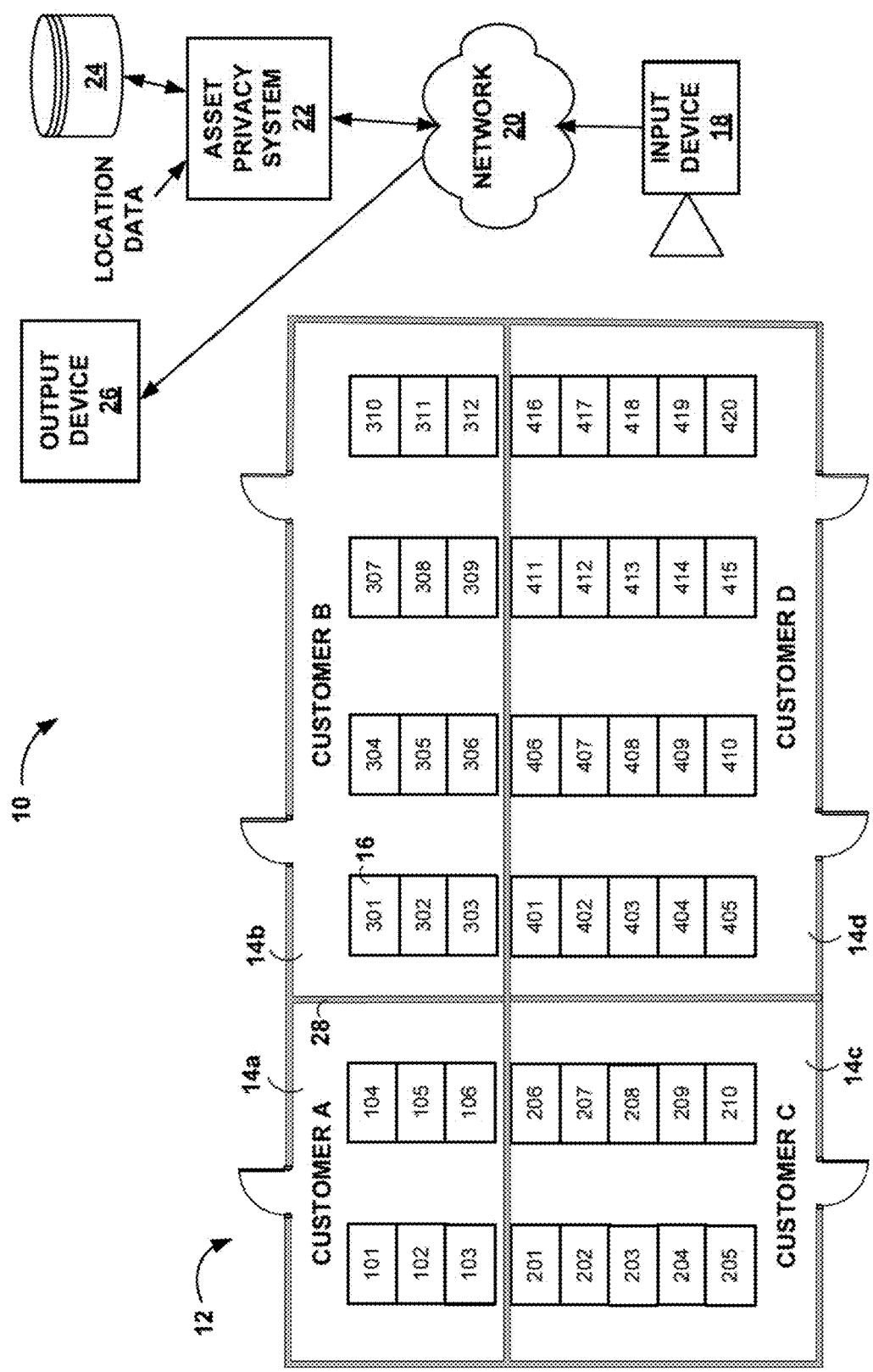
FIG. 1 is a block diagram illustrating an example asset viewing system for an example data center, in accordance with the aspects of the disclosure.

FIG. 1 is a block diagram illustrating an example asset viewing system 10 for an example data center 12, in accordance with the aspects of the disclosure. Data center 12 includes one or more assets. The assets may include physical structures related to power systems and cooling systems associated with controlling the environment within data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, the assets include devices related to security, lighting, electrical, structural integrity, occupancy, or energy credits, for example. The assets may further include storage gear such as, for example, cages, cabinets, racks, or the like.

One or more assets in data center 12 may be owned by different customers co-located within data center 12. For example, data center 12 includes a plurality of cages 14a-14d. In some examples, each cage 14a-14d is owned by a different customer. For example, customer A may own cage 14a, customer B may own cage 14b, customer C may own cage 14c, and customer D may own cage 14d. Within each cage 14a-14d, each customer A-D may own additional assets, such as cabinets 16, racks (not shown), servers (not shown), or other assets that may be located in data center 12. In some examples, cages 14a-14d are separated from each other, e.g., by walls 28. In some examples, walls 28 may provide visibility from one cage to another, therefore potentially allowing a customer to be able to see the assets owned by another customer. In some cases, walls 28 are opaque.

Asset viewing system 10 includes a network 20, an input device 18, an asset privacy system 22, and an asset database 24. Asset viewing system 10 may further include output device 26. Network 20 may include a private network associated with a provider, e.g., the provider of data center 12. In some examples, network 20 includes a public network, such as the Internet. Although illustrated as a single entity, network 20 may include a combination of public and/or private networks. In some examples, network 20 may include one or more of a wide area network (WAN) (e.g., the Internet), a local area network (LAN), a virtual private network (VPN), or another wired or wireless communication network.

Input device 18 is located in data center 12 and generates video data that includes images of customer assets. For example, input device 18 may include a video camera capable of generating an input video feed that includes images of one or more assets within data center 12. In some examples, the input video feed includes a live video feed. Although input device 18 is described herein as capturing an input video feed of data center 12, input device 18 may additionally or alternatively capture still images, capture still images from a video feed, or the like. In some examples, input device 18 is movable throughout data center 12, such as, for example, on one or more tracks within data center 12. As another example, input device 18 may be attached to headset or otherwise transported by a human user throughout the data center 12. In some examples, input device 18 rotates on one or more axes to change orientation. In some examples, input device 18 is stationary. Input device 18 may operate automatically, e.g., without a user physically present to operate input device 18. In some examples, a remote user, using an interface to asset viewing system 10, directs motion of input device 18 by controlling an apparatus to which input device 18 is affixed. In some examples, input device 18 may generate a shared input video feed. For example, input device 18 may generate a shared input video feed viewable by more than one customer (e.g., more than one customer that each owns one or more assets in data center 12). In some such examples, one or more of the customers may not want one or more of the other customers to be able to view its assets. Thus, in some such examples, asset privacy system 22 may be configured to generate an output video frame of one or more video frames by obscuring one or more assets in the input video feed frames.

Input device 18 sends the input video feed to asset privacy system 22 via network 20. Although communications among asset privacy system 22, input device 18, and output device 26 is illustrated as described as being transported by a network 20, other forms of communication links may be used. For example, video transmission links may couple input device 10 to asset privacy system 22. Example video cable types for such video transmission links include composite video, S-Video, component video, High Definition Multimedia Interface (HDMI), and Digital Video Interface (DVI). In such examples, input device 18 sends the input video feed to asset privacy system 22 via such video transmission links.

Input device 18 may have location data associated with it. For example, the location data may denote the location and/or orientation of input device 18 in data center 12. In some examples, the location data includes Cartesian coordinates to denote the location of input device 18 in data center 12. In some examples, the location data identifies a hall, room, aisle, cage, or other area within the data center 12 viewable by the input device 18. In some examples, the location data includes an altitude and azimuth to denote the orientation of input device 18. The location data may further include Global Positioning System (GPS) data or any other data relating to the location of input device 18. For example, the location data may include geofencing data relating to an area within the data center 12 viewable by the input device 18. In some examples, input device 18 sends the location data to asset privacy system 22 via network 20. Additionally, or alternatively, asset privacy system 22 may obtain or receive the location data from another source.

Asset privacy system 22 may identify an asset in an input video feed, determine if a customer is authorized to view the identified asset, and modify or obscure images of the asset in an output video feed. For example, asset privacy system 22 obscures one or more images of assets in an output video feed that a customer is not authorized to view. In some examples, asset privacy system 22 obscures one or more images of assets identified in an input video feed that are not owned by a customer who is to receive the output video feed. Additionally, or alternatively, asset privacy system 22 uses criteria other than ownership to determine if a customer is authorized to view an identified asset.

Asset privacy system 22 communicates with asset database 24 via a network, e.g., network 20, to obtain data in order to identify an asset and/or determine if a customer is authorized to view an identified asset. Asset database 24 may include data pertaining to the location, name, and/or ownership of assets in data center 12. In some examples, asset database 24 includes additional information about data center 12. In some examples, assets may have identifying information viewable within the input video feed. The identifying information may include a bar code, QR code, unique string, or other visual identifying information that uniquely identifies an asset to the asset privacy system 22.

Asset privacy system 22 generates an output video feed from the input video feed based on whether a customer is authorized to view one or more assets in the input video feed. More specifically, asset privacy system 22 obscures images of one or more assets in the input video feed to generate the output video feed having obscured images for the assets that a customer is not authorized to view. Asset privacy system 22 may obscure the images of one or more assets in one or more video frames, e.g., by replacing images of the assets with different images or by clouding or hazing the images to generate modified video frames that form an output video feed. In some examples, assert privacy system 22 may use a motion tracking algorithm, a pixel classification technique, a simultaneous localization and mapping (SLAM) technique, a marker-based identification technique, a markerless-based identification technique, a video editing technique, or any other technique to obscure images of one or more assets that the customer is not authorized to view or to identify the one or more assets in the input video feed.

In some examples, asset privacy system 22 may additionally or alternatively identify an area of data center 12 in an input video feed, determine if a customer is authorized to view the identified area of data center 12, and modify or obscure images of the area of data center 12 in an output video feed generated based on the input video feed. In this way, asset privacy system 22 may obscure an image of one or more areas of data center 12 instead of or in addition to obscuring images of one or more assets that a customer is not authorized to view. In some examples, an area of data center 12 includes groups of assets owned by a single customer. In some examples, an area of data center 12 includes two or more assets or groups of assets each owned by different customers. For example, a customer's assets in data center 12 may be surrounded by areas and/or groups of assets owned by different customers. In this example, asset privacy system 22 may obscure images of the areas surrounding the customer's assets that are owned by different customers rather than obscuring each identified asset itself. Obscuring images of one or more areas of data center 12 rather than obscuring individual assets may provide improved privacy for the customers of data center 12 in that the assets of other customers, the layout of the assets of other customers, the location of various assets of other customers, or the like may not be viewable to unauthorized customers.

In some examples, obscuring the images of one or more areas rather than individual assets may reduce the computing power required by asset privacy system 22. For example, asset privacy system 22 may determine which areas of data center 12 a customer is authorized to view and obscure the images of the areas in which the customer is not authorized to view. In contrast, if asset privacy system 22 obscures the images of individual assets, asset privacy system 22 may have to determine if a customer is authorized to view multiple assets that could be classified into a single area. As described herein, asset privacy system 22 identifying an item in an input video feed, determining if a customer is authorized to view the identified item, and modifying or obscuring images of the item in an output video feed applies to individual assets in data center 12, groups of assets in data center 12, areas of data center 12, and combinations thereof.

In the case in which asset privacy system 22 identifies, determines authorization, and obscures images with respect to one or more areas of data center 12, asset database 24 includes data pertaining to areas within data center 12. For example, asset database 24 may include one or more areas within data center 12 that each customer is authorized to view that may be able to be identified by asset privacy system, e.g., using location data. Areas of data center 12 may be defined in asset database 24 using coordinate systems, orientations of input device 18, area identifiers associated with different input video feeds, and so forth.

Asset privacy system 22 sends the generated output video feed to output device 26 associated with the customer, via network 20. In some examples, the output video feed includes virtual reality video, augmented reality video, a live video feed, an image or set of images, or other video data. Output device 26 is not limited to any particular type of device, and may include a computer, a laptop computer, a virtual reality headset, an electronic personal digital assistance device, and/or a mobile electronic device, such as, for example, a smart phone, each having or being associated with a display device for displaying the output video feed to a user, such display devices including, e.g., a liquid crystal display, a presence-sensitive display, and a television or monitor.

Figure 2:
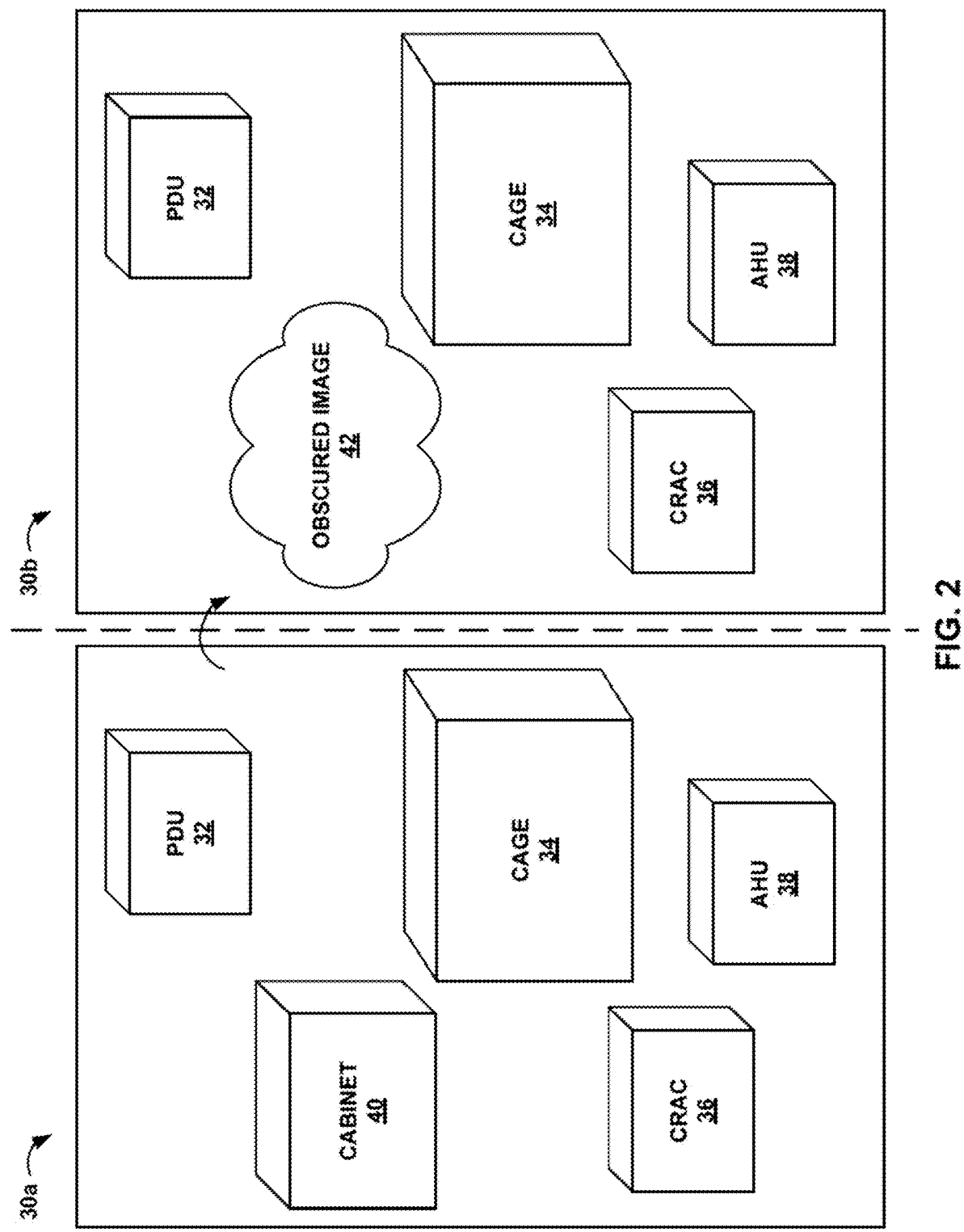
FIG. 2 is a block diagram illustrating an example input video feed and an example output video feed, in accordance with the aspects of the disclosure.

FIG. 2 is a block diagram illustrating an example input video feed 30*a* and an example output video feed 30*b*, in accordance with the aspects of the disclosure. For example, input video feed 30*a* includes the input video feed an asset privacy system receives from an input device, and output video feed 30*b* includes the output video feed generated by the asset privacy system and sent to an output device.

Input video feed 30*a* may include a plurality of assets. For example, input video feed 30*a* includes a PDU 32, a cabinet 40, a cage 34, a CRAC 36, and an AHU 38. In other examples, input video feed 30*a* may include any number or type of assets in accordance with the aspects of the disclosure. The plurality of assets in input video feed 30*a* may be owned by one or more customers. For example, PDU 32, cage 34, CRAC 36, and AHU 38 may be authorized for viewing by a first customer while cabinet 40 is not authorized for viewing by the first customer. For example, cabinet 40 may be owned by a second customer.

Asset viewing system 10 including the asset privacy system 22 in accordance with the aspects of the disclosure allows operators for the first customer to view its assets without being able to view the assets of another customer. For example, output video feed 30*b* may be the output video feed generated and output by the asset privacy system. In this example, the output video feed may be for the first customer, e.g., the customer that owns and is authorized to view PDU 32, cage 34, CRAC 36, and AHU 38. Output video feed 30*b* includes the assets owned by the first customer, e.g., PDU 32, cage 34, CRAC 36, and AHU 38, and an obscured image 42 in place of cabinet 40. The asset privacy system modifies the output video feed to include obscured image 42 in place of the image for cabinet 40 from input video feed 30*a* in the case where cabinet 40 is owned by the second customer and the first customer is not authorized to view cabinet 40. In this way, a first customer may view its assets, but the assets of another customer are obscured to improve the privacy of the second customer.

Although FIG. 2 was described with respect to 5 assets and 2 customers, any number of assets and customers are contemplated to be within the scope of the disclosure.

Figure 3:
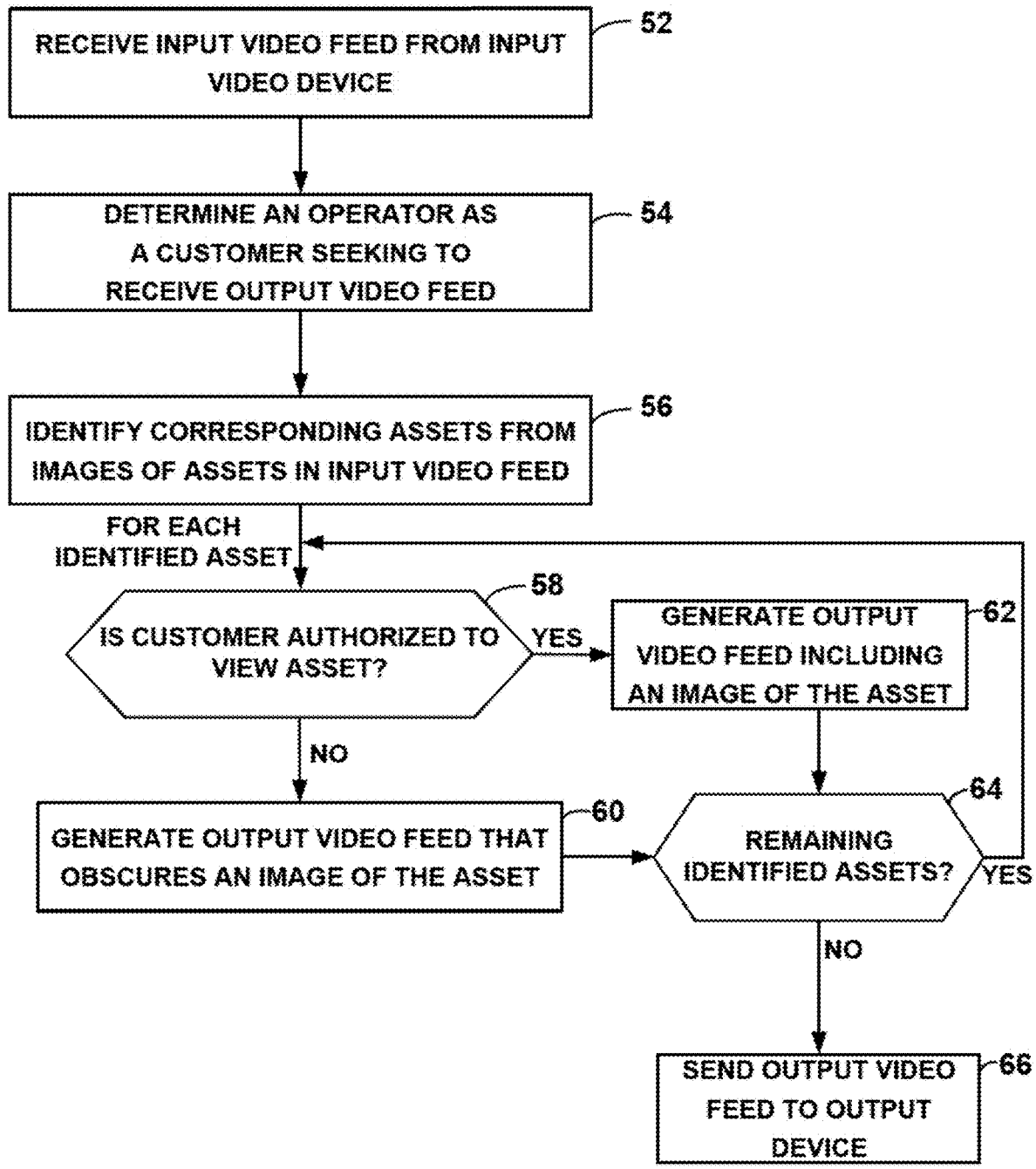
FIG. 3 is a flow diagram illustrating an example mode of operation for viewing one or more assets, in accordance with the aspects of the disclosure.

FIG. 3 is a flow diagram illustrating an example mode of operation 50 for viewing one or more assets, in accordance with the aspects of the disclosure. FIG. 3 will be described with respect to asset viewing system 10 from FIG. 1 for ease of description only. A person having ordinary skill in the art will recognize and appreciate that the example mode of operation of FIG. 3 may be performed in a variety of ways. FIG. 3 will be described with respect to assets for ease of description only. A person having ordinary skill in the art will recognize and appreciate that the example mode of operation of FIG. 3 may be performed with respect to areas in a data center, groups of assets in a data center, or the like in addition to or alternatively to assets.

Mode of operation 50 includes receiving, by asset privacy system 22, an input video feed that includes images of one or more assets located within a data center (52); identifying, by asset privacy system 22, one or more corresponding assets for the images of the one or more assets (56); and determining, by asset privacy system 22, an asset of the one or more assets, in the input video feed, a customer is not authorized to view (58). Mode of operation 50 may further include determining, by asset privacy system 22, an operator as the customer that is to receive an output video feed corresponding to the input video feed (54); generating, by asset privacy system 22 from the input video feed and based on the operator, an output video feed that obscures an image of the asset (60); sending, by the asset privacy system and to an output device, the output video feed, wherein the output video feed includes at least one obscured image of the one or more assets (66).

Asset privacy system 22 receives an input video feed from input device 18 via network 20 (52). The input video feed includes images of one or more assets. Asset privacy system 22 determines an operator as the customer seeking to receive an output video feed, e.g., on output device 26 (54). Asset privacy system 22 may determine the operator as the customer seeking to receive the output video feed by communicating with output device 26 via network 20. For example, asset privacy system 22 may communicate with output device 26 to determine which operator's or customer's credentials have been entered using output device 26, the location of output device 26, which customer owns output device 26, or the like.

Asset privacy system 22 identifies the corresponding one or more assets for the images of the one or more assets in the input video feed (56). In some examples, asset privacy system 22 receives or obtains location data via network 20. The location data may denote the location and/or orientation of input device 18. In some examples, asset privacy system 22 uses the location data to identify which assets are shown in the input video feed. For example, asset privacy system 22 may use Cartesian coordinates, polar coordinates, GPS data, geofencing data, or other location data or may use identifying information in the images of the assets in the input video feed to identify which assets are shown in the input video feed. In some examples, the assets may have identifying information viewable within the input video feed. The identifying information may include a bar code, QR code, unique string, or other visual identifying information that uniquely identifies an asset to the asset privacy system 22. In some examples, asset privacy system 22 accesses asset database 24 to determine which assets are shown in the input video feed. For example, asset database 24 may include the location of the assets in data center 12, and asset privacy system 22 may use the determined location of the asset shown in the input video feed to identify, e.g., using a look-up table, what asset it is. In some examples, asset privacy system 22 identifies which assets are shown in the input video feed using data other than the location data.

For each asset identified, asset privacy system 22 determines if the operator as the customer seeking to receive the output video feed is authorized to view the identified asset (58). In some examples, asset privacy system 22 may use asset database 24 to determine which customer owns the identified asset. For example, if the identified asset is cage 14*a*, asset privacy system 22 determines that customer A is the owner of that asset using the data in asset database 24. In some examples, asset privacy system 22 determines if the customer seeking to receive the output video on output device 26 is the same customer that owns the identified asset in order to determine if the customer is authorized to view the identified asset. In some examples, asset privacy system 22 uses additional or alternative criteria to determine if the customer who is to receive the output video is authorized to view the identified asset.

If asset privacy system 22 determines that the operator as the customer is not authorized to view the identified asset, asset privacy system 22 generates an output video feed that obscures an image of the identified asset (60). For example, asset privacy system 22 may blur, censor, block, or otherwise obscure the identified asset and/or a portion of the output video feed including the identified asset. In this way, the operator receiving the output video may not be able to identify or view assets that they are not authorized to view, e.g., assets owned by another customer, while still being able to view its assets.

If asset privacy system 22 determines that the operator as a customer is authorized to view the identified asset, asset privacy system 22 generates the output video feed including the image of the identified asset (62).

After an output video feed has been generated for the identified asset, asset privacy system 22 determines if there are any remaining identified assets (64). If there are remaining identified assets, asset privacy system 22 determines if the operator as the customer is authorized to view each identified asset and generates an output video based on that determination, in accordance with the mode of operation described herein. After asset privacy system 22 has generated an output video feed for each identified asset, asset privacy system 22 sends the output video feed to output device 26 (66). In some examples, the output video feed includes at least one obscured image of the one or more identified assets. In other examples, the output video includes no obscured images of the one or more identified assets.

Figure 4:
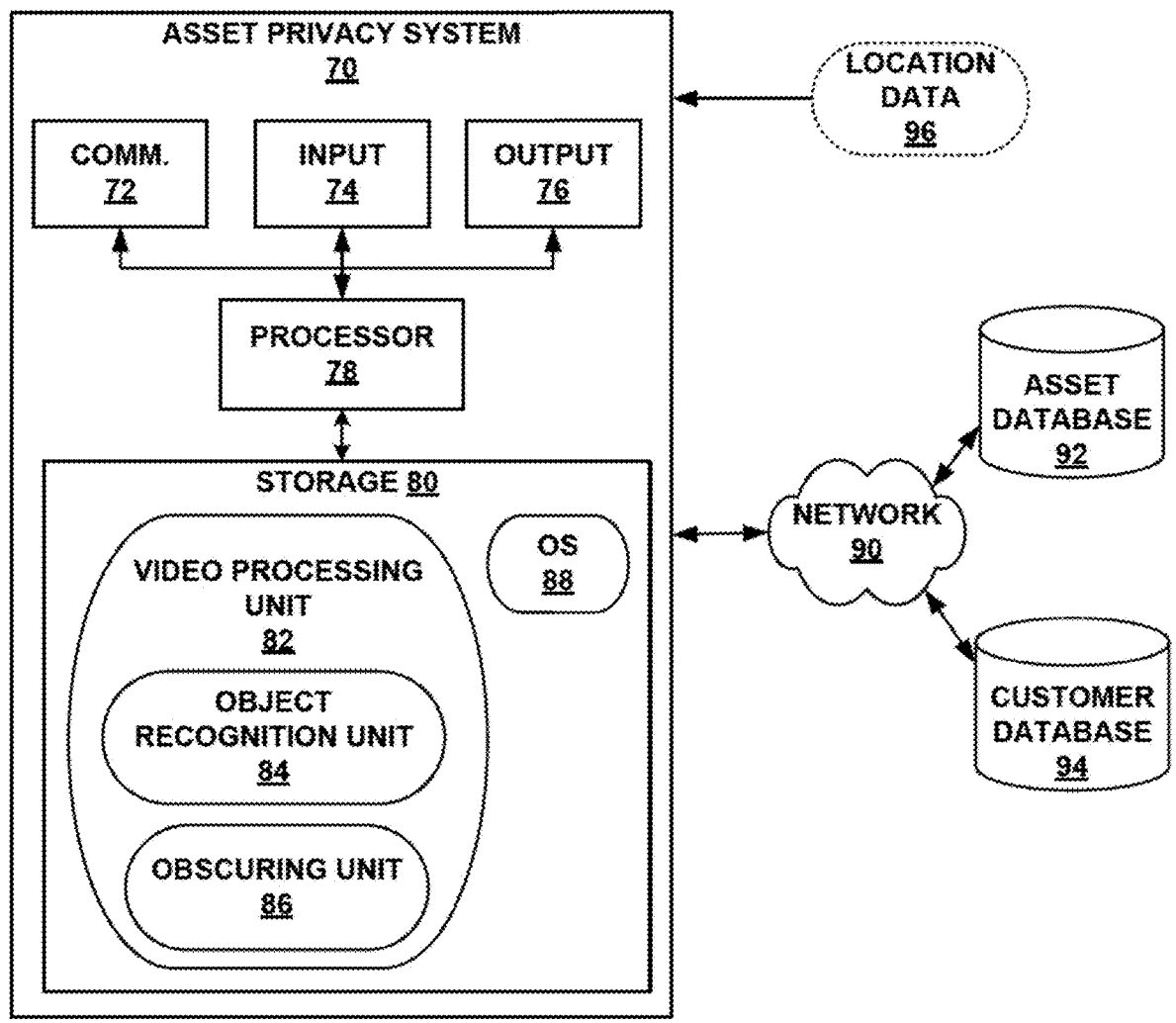
FIG. 4 is a block diagram illustrating an example asset privacy system, in accordance with the aspects of the disclosure.

FIG. 4 is a block diagram illustrating an example asset privacy system 70, in accordance with the aspects of the disclosure. FIG. 4 will be described with respect to assets for ease of description only. A person having ordinary skill in the art will recognize and appreciate that the example asset privacy system of FIG. 4 may be performed with respect to areas in a data center, groups of assets in a data center, or the like in addition to or alternatively to assets. Asset privacy system 70 includes one or more communication units 72, one or more input devices 74, and one or more output devices 76. Asset privacy system 70 includes one or more processors 78 and one or more storage devices 80. The one or more storage devices 80 include operating system 88 and video processing unit 82. One or more of the devices, units, storage areas, or other components of asset privacy system 70 may be interconnected to enable inter-component communications (physically, communicatively, and/or operatively). In some examples, such connectivity may be provided by through a system bus, a network connection, an inter-process communication data structure, or any other method for communicating data. Video processing unit 82 may be executed in a distributed manner by multiple servers, of which asset privacy system 70 is an example.

One or more input devices 74 of asset privacy system 70 may generate, receive, or process input. Such input may include input from an input device, such as, for example, an input video feed from a video camera. As such, one of input devices 74 may be include or be coupled to a video cable interface and may in some cases include processing circuitry for processing the input video feed and storing corresponding video data to storage 80 for processing by video processing unit 82. Additionally, or alternatively, one or more input devices 74 may generate, receive, or process input from a keyboard, pointing device, voice responsive system, button, sensor, mobile device, control pad, microphone, presence-sensitive screen, network, or any other type of device for detecting input from a human or machine.

One or more output devices 76 of asset privacy system 70 may generate, transmit, or process output. In some examples, the output may be tactile, audio, visual, and/or video output. For example, the output of the one or more output devices 76 may be an output video feed. Output devices 76 may include a display, sound card, video graphics adapter card, speaker, presence-sensitive screen, one or more USB interfaces, video and/or audio output interfaces, or any other type of device capable of generating tactile, audio, video, or other output. In some examples, output devices 76 may include a display device, which may function as an output device using technologies including liquid crystal displays (LCD), quantum dot displays, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 72 of asset privacy system 70 may communicate with devices external to asset privacy system 70 by sending and/or receiving data, and may operate, in some respects, as both an input device and an output device. In some examples, communication units 72 may communicate with other devices over a network, e.g., network 90. Input signals to communication units 72 may include input from an input device, such as, for example, an input video feed from a video camera. As such, communication units 72 may in some cases include processing circuitry for processing the input video feed and storing corresponding video data to storage 80 for processing by video processing unit 82.

In other examples, communication units 72 may send and/or receive radio signals on a radio network such as a cellular radio network. In other examples, communication units 72 of asset privacy system 70 may transmit and/or receive satellite signals on a satellite network such as a GPS network. Examples of communication units 72 include a network interface card (e.g. such as an Ethernet card), an optical transceiver, a radio frequency transceiver, a GPS receiver, or any other type of device that can send and/or receive information. Other examples of communication units 72 may include Bluetooth®, GPS, 3G, 4G, and Wi-Fi® radios found in mobile devices as well as Universal Serial Bus (USB) controllers and the like.

One or more processors 78 of asset privacy system 70 may implement functionality and/or execute instructions. Examples of processors 78 include microprocessors, application processors, display controllers, auxiliary processors, one or more sensor hubs, and any other hardware configured to function as a processor, a processing unit, a processing device, or processing circuitry. Asset privacy system 70 may use one or more processors 78 to perform operations in accordance with one or more aspects of the present disclosure using software, hardware, firmware, or a mixture of hardware, software, and firmware stored by and/or executing at asset privacy system 70.

One or more storage devices 80 may store information for processing during operation of asset privacy system 70. In some examples, one or more storage devices 80 are temporary memories, meaning that a primary purpose of the one or more storage devices is not long-term storage. Storage devices 80 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 80, in some examples, also include one or more computer-readable storage media. Storage devices 80 may be configured to store larger amounts of information than volatile memory. Storage devices 80 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 80 may store program instructions and/or data associated with one or more of the units described in accordance with one or more aspects of this disclosure.

One or more processors 78 and one or more storage devices 80 may provide an operating environment or platform for one or more units, which may be implemented as software, but may in some examples include any combination of hardware, firmware, and software. One or more processors 78 may execute instructions and one or more storage devices 80 may store instructions and/or data of one or more units. The combination of processors 78 and storage devices 80 may retrieve, store, and/or execute the instructions and/or data of one or more applications, units, or software. Processors 78 and/or storage devices 80 may also be operably coupled to one or more other software and/or hardware components, including, but not limited to, one or more of the components illustrated in FIG. 4.

One or more units illustrated in FIG. 4 as being included within storage devices 80 (or units otherwise described herein) may perform operations described using software, hardware, firmware, or a mixture of hardware, software, and firmware residing in and/or executing at asset privacy system 70. Asset privacy system 70 may execute each of the unit(s) with multiple processors or multiple devices. Asset privacy system 70 may execute one or more of such units natively, or as a virtual machine or container executing on underlying hardware. One or more of such units may execute as one or more services of an operating system 88 or computing platform. One or more of such units may execute as one or more executable programs at an application layer of an operating platform provided by operating system 88.

Storage device 80 include an operating system 88 and a video processing unit 82 for performing operations related to the asset viewing system in accordance with the disclosure. Asset privacy system 70 may receive an input video feed, e.g., via communication unit 72 and network 90. The input video feed includes images of one or more assets. Video processing unit 82 analyzes and/or generates an output video feed. In some examples, video processing unit 82 obscures images of one or more assets.

In some examples, video processing unit 82 includes object recognition unit 84. Object recognition unit 84 may determine an operator as a customer seeking to receive an output video feed. Object recognition unit 84 may communicate with an output device and/or with a customer database 94 via network 90 to determine which operator as a customer seeks to receive the output video feed, or object recognition unit 84 may determine which operator as a customer seeks to receive the output video feed in another way. Customer database 94 may include information about one or more customers co-located within a data center, such as, for example, output devices owned by the customer, the location of the customer, credentials used by the customer or by the operator associated with the customer to access the asset viewing system described herein, or the like. Customer database 94 may further include information about one or more assets owned by the one or more customers.

Object recognition unit 84 identifies the corresponding one or more assets for the images of the one or more assets in the input video feed. In some examples, object recognition unit 84 uses the input video feed, location data 96, and an asset database 92 to identify the corresponding one or more assets for the images of the one or more assets in the input video feed, in accordance with the aspects of the disclosure. For example, asset database 92 may include data pertaining to the location, name, identifying information and/or ownership of assets in a data center. The identifying information may include a bar code value, QR code value, unique string, or other identifying information that uniquely identifies an asset. In some examples, asset database 92 includes additional information about the data center. Objection recognition unit 84 may use location data 96, e.g., location data of an input device, and the locations of assets in asset database 92 to determine the corresponding asset for the images of the asset in the input video feed. Location data 96 may include Cartesian coordinates to denote the location of an input device in a data center, a hall, room, aisle, cage, or other area within the data center viewable by the input device, an altitude and azimuth to denote the orientation of the input device, GPS data, geofencing data, or any other data relating to the location of the input device or the image of an asset in the input video feed.

In some examples, the images of the assets may have identifying information viewable within the input video feed. The identifying information may include a bar code, QR code, unique string, or other visual identifying information that uniquely identifies an asset in asset database 92. Object recognition unit 84 may use the identifying information and asset database 92 to identify an asset from an image of the asset in the input video feed. For example, asset database 92 may include the identifying information and the asset the identifying information corresponds to. Asset database 92 may include a list of all of the assets in a data center and the location data 96, identifying information, customer ownership information, and any other information corresponding to each asset.

In some examples, object recognition unit 84 determines if a customer is authorized to view an identified asset. Object recognition unit 84 may use data from asset database 92 and/or customer database 94 to determine if a customer is authorized to view an identified asset. In some examples, object recognition unit 84 uses both asset database 92 and customer database 94 to determine if a customer is authorized to view an identified asset. In other examples, object recognition unit 84 uses only one of asset database 92 or customer database 94 to determine if a customer is authorized to view an identified asset. In some examples, a customer may be authorized to view an asset if it owns the asset. In some examples, other criteria may be used to determine if a customer is authorized to view an asset.

Video processing unit 82 includes obscuring unit 86. Obscuring unit 86 generates an output video feed. In some examples, obscuring unit obscures at least images of the one or more identified assets that a customer is not authorized to view. Obscuring unit 86 may communicate with object recognition unit 84 in order to determine which images of the one or more identified assets to obscure. Obscuring unit 86 may blur, censor, block, or otherwise obscure the identified asset or a portion of the output video feed including the identified asset that the customer is not authorized to view. In some examples, obscuring unit 86 may use a motion tracking algorithm, a pixel classification technique, a simultaneous localization and mapping (SLAM) technique, a marker-based identification technique, a markerless-based identification technique, a video editing technique, or any other technique to obscure images of one or more assets that the customer is not authorized to view. In some examples, obscuring unit 86 obscures more than one identified asset. In some examples, obscuring unit 86 generates an output video feed that includes one or more images of identified assets that are not obscured. In some examples, obscuring unit 86 may determine if a customer is authorized to view an image of an identified asset in addition to or alternatively to object recognition unit 84. Asset privacy system 70 may output the output video feed, e.g., via communication unit 72 and network 90.

The techniques described herein may be implemented in hardware, software, firmware, or any combination thereof. Various features described as modules, units, or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may include one or more computer-readable storage media.

In some examples, the computer-readable storage media includes non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   receiving, by an asset privacy system, an input video feed that includes images of one or more assets located within a data center;
   communicating, by the asset privacy system, with an asset database to obtain identifying information for uniquely identifying each of the one or more assets and to obtain authorization data that indicates whether a customer of a data center provider for the data center is authorized to view each of the one or more assets;
   identifying, by the asset privacy system, based at least on the identifying information, one or more corresponding assets for the images of the one or more assets;
   determining, by the asset privacy system, based at least on the authorization data, the customer is not authorized to view an asset of the one or more corresponding assets; and
   generating, from the input video feed, by the asset privacy system based at least on the determining, an output video feed that does not include images of the asset the customer is not authorized to view and that does include images of at least one other asset of the one or more corresponding assets.

2. The method of claim 1, further comprising:
   determining, by the asset privacy system, an operator as the customer that is to receive the output video feed.

3. The method of claim 1, wherein generating, by the asset privacy system, the output video feed comprises:
   generating, by the asset privacy system, the output video feed to obscure the images of the asset the customer is not authorized to view and that are included in the input video feed.

4. The method of claim 1, further comprising:
   sending, by the asset privacy system and to an output device, the output video feed.

5. The method of claim 1, further comprising:
   receiving, by the asset privacy system, location data, wherein the location data includes the location of an input device that generates the input video feed, and wherein identifying, by the asset privacy system, the one or more corresponding assets comprises using the location data to identify the one or more corresponding assets.

6. The method of claim 5, wherein the location data further includes an orientation of the input device.

7. The method of claim 5, wherein the location data is at least one of Cartesian coordinates, an altitude and azimuth, Global Positioning System (GPS) data, or a geofence.

8. The method of claim 1,
   wherein the customer is a first customer, the method further comprising:
   sending, by the asset privacy system to an output device in response to determining a second customer is authorized to view every asset of the one or more assets, an output video feed that is the input video feed.

9. The method of claim 1, wherein identifying, by the asset privacy system, the one or more corresponding assets in the input video feed comprises identifying the one or more corresponding assets from identifying information visible in the images of the one or more assets.

10. A system comprising:
    an input device configured to generate an input video feed that includes images of one or more assets located within a data center; and
    an asset privacy system comprising one or more processors, the one or more processors configured to:
    receive the input video feed;
    communicate with an asset database to obtain identifying information for uniquely identifying each of the one or more assets and to obtain authorization data that indicates whether a customer of a data center provider for the data center is authorized to view each of the one or more assets;
    identify, based at least on the identifying information, one or more corresponding assets for the images of the one or more assets;
    determine, based at least on the authorization data, the customer is not authorized to view an asset of the one or more corresponding assets; and
    generate, from the input video feed based at least on the determination, an output video feed that does not include images of the asset the customer is not authorized to view and that does include images of at least one other asset of the one or more corresponding assets.

11. The system of claim 10, wherein the one or more processors are further configured to:
    determine an operator as the customer that is to receive the output video feed.

12. The system of claim 10, wherein to generate the output video feed, the one or more processors are configured to:
    generate the output video feed to obscure the images of the asset the customer is not authorized to view and that are included in the input video feed.

13. The system of claim 10, wherein the one or more processors are configured to:
    send, to an output device, the output video feed.

14. The system of claim 10, wherein the one or more processors are configured to:
    receive location data, wherein the location data includes the location of the input device that generates the input video feed, and wherein to identify the one or more assets in the input video feed, the one or more processors are configured to use the location data to identify the one or more assets.

15. The system of claim 14, wherein the location data further includes an orientation of the input device.

16. The system of claim 14, wherein the location data is at least one of Cartesian coordinates, an altitude and azimuth, Global Positioning System (GPS) data, or a geofence.

17. The system of claim 10,
    wherein the customer is a first customer, and wherein the one or more processors are further configured to:
    send, to an output device in response to determining a second customer is authorized to view every asset of the one or more assets, an output video feed that is the input video feed.

18. The system of claim 10, wherein to identify the one or more assets in the input video feed, the one or more processors are configured to identify the one or more assets from identifying information visible in the images of the one or more assets.

19. A system comprising:
    an input device configured to generate an input video feed that includes images of one or more areas located within a data center; and
    an asset privacy system comprising one or more processors, the one or more processors configured to:
    receive the input video feed;

communicate with an asset database to obtain identifying information for identifying each of the one or more areas and to obtain authorization data that indicates whether a customer of a data center provider for the data center is authorized to view each of the one or more areas;

identify, based at least on the identifying information, one or more corresponding areas for the images of the one or more areas;

determine, based at least on the authorization data, the customer is not authorized to view an area of the one or more corresponding areas; and generate, from the input video feed based at least on the determination, an output video feed that does not include images of the area the customer is not authorized to view and that does include images of at least one other area of the one or more corresponding areas.

20. The system of claim 19, wherein to generate the output video feed, the one or more processors are configured to:

generate the output video feed to obscure the images of the area the customer is not authorized to view and that are included in the input video feed.

21. The method of claim 1, wherein the authorization data indicates whether the customer is an owner of each of the one or more assets, and wherein determining the customer is not authorized to view the asset comprises determining, based on the authorization data, the customer is not an owner of the asset.

22. The system of claim 10, wherein the authorization data indicates whether the customer is an owner of each of the one or more assets, and wherein, to determine the customer is not authorized to view the asset, the one or more processors are configured to determine, based on the authorization data, the customer is not an owner of the asset.

23. The system of claim 19, wherein the authorization data indicates whether the customer has assets located in each of the one or more areas, and wherein, to determine the customer is not authorized to view the area, the one or more processors are configured to determine, based on the authorization data, the customer does not have assets located in the area.

* * * * *